(12) United States Patent
Nogami et al.

(10) Patent No.: US 11,769,873 B2
(45) Date of Patent: Sep. 26, 2023

(54) ION CONDUCTOR CONTAINING LI2B12H12 AND LIBH4, METHOD FOR PRODUCING SAME, AND SOLID ELECTROLYTE FOR ALL-SOLID-STATE BATTERIES, WHICH CONTAINS SAID ION CONDUCTOR

(71) Applicants: MITSUBISHI GAS CHEMICAL COMPANY, INC., Tokyo (JP); TOHOKU TECHNO ARCH CO., LTD., Miyagi (JP)

(72) Inventors: Genki Nogami, Niigata (JP); Masahiro Shimada, Tokyo (JP); Naoki Toyama, Miyagi (JP); Sangryun Kim, Miyagi (JP); Shin-ichi Orimo, Miyagi (JP)

(73) Assignees: MITSUBISHI GAS CHEMICAL COMPANY, INC., Tokyo (JP); TOHOKU TECHNO ARCH CO., LTD., Miyagi (JP)

(*) Notice: Subject to any disclaimer, the term of this patent is extended or adjusted under 35 U.S.C. 154(b) by 679 days.

(21) Appl. No.: 16/971,868

(22) PCT Filed: Feb. 22, 2019

(86) PCT No.: PCT/JP2019/006673
§ 371 (c)(1),
(2) Date: Aug. 21, 2020

(87) PCT Pub. No.: WO2019/167813
PCT Pub. Date: Sep. 6, 2019

(65) Prior Publication Data
US 2021/0083272 A1    Mar. 18, 2021

(30) Foreign Application Priority Data
Feb. 28, 2018  (JP) .................... 2018-034929

(51) Int. Cl.
H01M 4/36    (2006.01)
C01B 6/21    (2006.01)
(Continued)

(52) U.S. Cl.
CPC ............... H01M 4/364 (2013.01); C01B 6/21 (2013.01); H01M 4/0471 (2013.01);
(Continued)

(58) Field of Classification Search
None
See application file for complete search history.

(56) References Cited

U.S. PATENT DOCUMENTS

| | | |
|---|---|---|
| 2016/0204467 A1 | 7/2016 | Nogami et al. |
| 2019/0080814 A1 | 3/2019 | Shimada et al. |

FOREIGN PATENT DOCUMENTS

| | | |
|---|---|---|
| CN | 107344713 A | 11/2017 |
| JP | 6246816 B2 | 12/2017 |
| WO | 2017/126416 A1 | 7/2017 |

OTHER PUBLICATIONS

"Bifunctional Li2B12H12 for energy storage and conversion applications: solid state electrolyte and luminescent down-conversion dye" in Journal of Materials Chemistry A, 2015, 3, 22853 to Teprovich, Jr., et al. (Year: 2015).*

(Continued)

*Primary Examiner* — Wyatt P McConnell
(74) *Attorney, Agent, or Firm* — GREENBLUM & BERNSTEIN, P.L.C.

(57) ABSTRACT

The present application provides a method for producing an ion conductor containing Li2B12H12 and LiBH4, which includes obtaining a mixture by mixing LiBH4 and B10H14 at a molar ratio LiBH4/B10H14 of from 2.1 to 4.3; and subjecting the mixture to a heat treatment.

11 Claims, 5 Drawing Sheets

(51) Int. Cl.
    *H01M 4/04*     (2006.01)
    *H01M 10/0525*  (2010.01)
    *H01M 10/0562*  (2010.01)
(52) U.S. Cl.
    CPC ... *H01M 10/0525* (2013.01); *H01M 10/0562* (2013.01); *C01P 2002/74* (2013.01)

(56) References Cited

OTHER PUBLICATIONS

Teprovich Jr. et al., "Bi-functional Li2B12H12 for energy storage and conversion applications: solid-state electrolyte and luminescent down-conversion dye", Journal of Materials Chemistry A, 3, <url:http://www.researchgate.net/publication/283243432>, DOI:10.1039/C5TA06549F>, 2015, pp. 22853-22859.

International Search Report issued in International Pat. Appl. No. PCT/JP2019/006673, dated Apr. 16, 2019, along with an English translation thereof.

Varley et al. "Understanding Ionic Conductivity Trends in Polyborane Solid Electrolytes from Ab Initio Molecular Dynamics", ACS Energy Letters (2017) pp. 250-255.

Paskevicius et al. "First-order phase transition in the $Li_2B_{12}H_{12}$ system", Physical Chemistry Chemical Physics (2013) pp. 15825-15828.

Office Action issued in India Patent Application No. 202017029618 dated Jun. 8, 2022, along with English translation thereof.

Ziheng Lu, et al., "Metal Borohydrides as Electrolytes for Solid-State Li, Na, Mg, and Ca Batteries: A First-Principles Study" Chemistry of Materials (2017) vol. 29, No. 21, pp. 9308-9319.

Extended European Search Report issued in European Patent Application No. 19760196.6 dated Mar. 10, 2021.

\* cited by examiner

ION CONDUCTOR CONTAINING LI2B12H12 AND LIBH4, METHOD FOR PRODUCING SAME, AND SOLID ELECTROLYTE FOR ALL-SOLID-STATE BATTERIES, WHICH CONTAINS SAID ION CONDUCTOR

TECHNICAL FIELD

The present invention relates to an ion conductor containing $Li_2B_{12}H_{12}$ and $LiBH_4$, a method for producing the same, and a solid electrolyte for all-solid-state batteries comprising the ion conductor.

BACKGROUND ART

Recently, a demand for lithium ion secondary batteries has been increased in applications including portable information terminals, portable electronic equipments, electric vehicles, hybrid electric vehicles and stationary power storage systems.

However, currently, a flammable organic solvent is used as an electrolytic solution in lithium ion secondary batteries, and a strong exterior is required so that an organic solvent does not leak out. Further, for example, in the case of portable personal computers, it is necessary to employ a structure against a risk at the time when an electrolytic solution leaks out. Thus, there is a limitation on structures of devices.

Moreover, the range of applications thereof has been widened to movable bodies such as vehicles and aircrafts, and a high capacity is desired for stationary lithium ion secondary batteries. Under such circumstances, importance tends to be placed on safety more than before, and efforts are concentrated on the development of an all-solid-state lithium ion secondary battery in which none of toxic substances such as organic solvents is used.

For example, use of an oxide, phosphate compound, organic polymer, sulfide, complex hydride or the like as a solid electrolyte in an all-solid-state lithium ion secondary battery has been examined.

All-solid-state batteries are broadly classified into the thin film type and the bulk type. In the case of the thin film type, interface bonding is ideally formed by utilizing gas phase film formation, but the electrode layer is thin (several μm), the electrode area is small, the amount of energy which can be stored per cell is small, and the cost is high. Therefore, it is inappropriate as a battery for large electrical storage devices or electric vehicles, wherein a large amount of energy must be stored. Meanwhile, in the case of the bulk type, the thickness of the electrode layer can be adjusted to be several tens μm to 100 μm, and it is possible to prepare an all-solid-state battery having a high energy density.

Among solid electrolytes, a sulfide and a complex hydride have characteristics that they have high ion conductivity and are relatively soft, and that therefore it is easy to form the interface between solids. For this reason, applications thereof to bulk type all-solid-state batteries have been examined (Patent Documents 1 and 2).

However, a conventional sulfide solid electrolyte and complex hydride solid electrolyte have characteristics that they react with water, and there are problems that a sulfide generates hydrogen sulfide, that a complex hydride generates hydrogen, and that after any of such solid electrolyte reacts with water, the ion conductivity is reduced. Further, the complex hydride solid electrolyte tends to have ion conductivity that is slightly lower than that of the sulfide solid electrolyte, and it is desired to improve the ion conductivity.

PRIOR ART DOCUMENTS

Patent Documents

Patent Document 1: Japanese Patent No. 6246816
Patent Document 2: WO2017/126416

SUMMARY OF THE INVENTION

Problems to be Solved by the Invention

The objective of the present invention is to provide an ion conductor excellent in various characteristics including water resistance and ion conductivity, a method for producing the same, and a solid electrolyte for all-solid-state batteries comprising the ion conductor.

Means for Solving the Problems

The present inventors diligently made researches in order to solve the above-described problems, and found that the problems can be solved by an ion conductor obtained by mixing $LiBH_4$ and $B_{10}H_{14}$ at a specific molar ratio. Specifically, the present invention is as described below.

<1> A method for producing an ion conductor comprising $Li_2B_{12}H_{12}$ and $LiBH_4$, which comprises:
  a step of obtaining a mixture by mixing $LiBH_4$ and $B_{10}H_{14}$ at a molar ratio $LiBH_4/B_{10}H_{14}$ of from 2.1 to 4.3; and
  a step of subjecting the mixture to a heat treatment.

<2> The method for producing an ion conductor according to item <1>, wherein the temperature of the heat treatment is 100 to 300° C.

<3> The method for producing an ion conductor according to item <1> or <2>, which comprises a step of subjecting the mixture to a mechanical milling treatment prior to the step of the heat treatment.

<4> The method for producing an ion conductor according to item <3>, wherein the time for carrying out the mechanical milling treatment is 0.5 to 7 hours.

<5> The method for producing an ion conductor according to item <3> or <4>, which comprises a step of subjecting the mixture to a second mechanical milling treatment after the step of the heat treatment.

<6> The method for producing an ion conductor according to item <5>, wherein the time for carrying out the second mechanical milling treatment is 10 to 30 hours.

<7> The method for producing an ion conductor according to any one of items <1> to <6>, wherein the ion conductor obtained has peaks at at least −15.6 ppm (±1 ppm), −17.6 ppm (±1 ppm), −1.7 ppm and −29.4 ppm (±1.5 ppm), and −42.0 ppm (±2 ppm) in a $B^{11}$MAS NMR measurement, and wherein when −15.6 ppm (1 ppm) is regarded as Peak A and −42.0 ppm (±2 ppm) is regarded as Peak B, the intensity ratio of Peak B to Peak A (B/A) is 0.1 to 2.0.

<8> A method for producing an all-solid-state battery, which comprises a step of carrying out molding using the ion conductor obtained by the method according to any one of items <1> to <7> under an atmosphere at a dew point of −30° C. to −80° C.

<9> An ion conductor containing $Li_2B_{12}H_{12}$ and $LiBH_4$, which has peaks at at least −15.6 ppm (±1 ppm), −17.6 ppm (±1 ppm), −1.7 ppm and −29.4 ppm (±1.5 ppm), and −42.0 ppm (±2 ppm) in a $B^{11}$MAS NMR measurement, wherein when −15.6 ppm (±1 ppm) is regarded as Peak A and −42.0 ppm (±2 ppm) is regarded as Peak B, the intensity ratio of Peak B to Peak A (B/A) is 0.1 to 2.0.

<10> The ion conductor according to item <9>, which has X-ray diffraction peaks at at least 2θ=16.1±0.5 deg, 18.6±0.5 deg, 24.0±0.5 deg, 24.9±0.8 deg, 27.0±0.8 deg, 31.0±0.8 deg and 32.5±0.8 deg.

<11> A solid electrolyte for all-solid-state batteries, which comprises the ion conductor according to item <9> or <10>.

Advantageous Effect of the Invention

According to the present invention, it is possible to provide an ion conductor excellent in various characteristics including water resistance and ion conductivity, a method for producing the same, and a solid electrolyte for all-solid-state batteries comprising the ion conductor.

EMBODIMENTS FOR CARRYING OUT THE INVENTION

Hereinafter, embodiments of the present invention will be described. Note that materials, constitutions, etc. described below do not limit the present invention and can be modified variously within the range of the gist of the present invention.

1. Ion Conductor

According to one embodiment of the present invention, an ion conductor, which contains $Li_2B_{12}H_{12}$ and $LiBH_4$, and which contains $[B_{12}H_{12}]^{2-}$, $[B_{11}H_{11}]^{2-}$, $[B_{10}H_{10}]^{2-}$ and $[BH_4]^-$ as anions, is provided. Regarding these anions, in a BMAS NMR measurement, $[B_{12}H_{12}]^{2-}$ has a peak at −15.6 ppm (+1 ppm), $[B_{11}H_{11}]^{2-}$ has a peak at −17.6 ppm (+1 ppm), $[B_{10}H_{10}]^{2-}$ has peaks at −1.7 ppm and −29.4 ppm (±1.5 ppm), and $[BH_4]^-$ has a peak at −42.0 ppm (±2 ppm).

The ion conductor of the present invention is characterized in that it contains borohydride ($BH_4^-$). When the content of $BH_4^-$ is higher, ion conductivity is higher, but water resistance is reduced. Accordingly, desired physical properties can be obtained by adjusting the content. Regarding the ion conductor of the present invention, when a peak at −15.6 ppm (±1 ppm) based on $[B_{12}H_{12}]^{2-}$ is regarded as A and a peak at −42.0 ppm (±2 ppm) based on $[BH_4]^-$ is regarded as B, the intensity ratio of the peak B to the peak A (B/A) is 0.1 to 2.0, preferably 0.2 to 1.5, and more preferably 0.3 to 1.2. By setting the intensity ratio (B/A) within the range of from 0.1 to 2.0, an ion conductor excellent in water resistance and ion conductivity can be obtained.

Further, the ion conductor of the present invention may contain components other than lithium (Li), boron (B) and hydrogen (H). Examples of the other components include oxygen (O), nitrogen (N), sulfur (S), fluorine (F), chlorine (Cl), bromine (Br), iodine (I), silicon (Si), germanium (Ge), phosphorus (P), an alkali metal and an alkaline earth metal.

The ion conductor of the present invention preferably has X-ray diffraction peaks at at least 2θ=16.1±0.5 deg, 18.6±0.5 deg, 24.0±0.5 deg, 24.9±0.8 deg, 27.0±0.8 deg, 31.0±0.8 deg and 32.5±0.8 deg, and more preferably has X-ray diffraction peaks at at least 2θ=16.1±0.5 deg, 18.6±0.5 deg, 24.0±0.5 deg, 24.9±0.8 deg, 27.0±0.8 deg, 31.0±0.8 deg, 32.5±0.8 deg, 37.7±1.0 deg, 38.9±1.0 deg, 41.2±1.2 deg and 43.5±1.2 deg. Note that even when an X-ray diffraction peak other than the above-described ones is included, desired effects are obtained by the ion conductor of the present invention.

The above-described ion conductor has excellent ion conductivity. The above-described X-ray diffraction peaks correspond to diffraction peaks derived from the crystal structures of $Li_2B_{12}H_{12}$ and $LiBH_4$. Since the peak intensity of $Li_2B_{12}H_{12}$ is high, it is considered that though a plurality of types of anions exist, many are solid-soluted in $Li_2B_{12}H_{12}$ crystal. Unlike $BH_4$, the decomposition rate of $[B_{12}H_{12}]^{2-}$ using water is very low. Accordingly, $[B_{12}H_{12}]^{2-}$ has significantly high stability against water, and when water exists, $[B_{12}H_{12}]^{2-}$ forms a hydrate and exists as a stable crystal. For this reason, even if an unstable anion such as $BH_4^-$ is mixed with and exists in $[B_{12}H_{12}]^{2-}$, water resistance can be significantly improved.

The above-described ion conductor is soft like $LiBH_4$ solid electrolyte and can be formed into an electrode layer and a solid electrolyte layer by means of cold pressing. Further, the electrode layer and solid electrolyte layer thus formed are more excellent in strength when compared to cases where a sulfide solid electrolyte or an oxide solid electrolyte is contained in a large amount. Accordingly, by using the ion conductor of the present invention, an electrode layer and a solid electrolyte layer which have excellent formability and are not easily broken (cracking does not easily occur) can be prepared. Moreover, since the ion conductor of the present invention has a low density, a relatively light electrode layer and solid electrolyte layer can be prepared. It is preferred because the weight of a whole battery can be decreased thereby. Furthermore, when the ion conductor of the present invention is used in a solid electrolyte layer, the interface resistance between that and an electrode layer can be reduced.

2. Method for Producing Ion Conductor

The above-described ion conductor of the present invention can be produced according to a method which includes: a step of obtaining a mixture by mixing $LiBH_4$ and $B_{10}H_{14}$ at a molar ratio $LiBH_4/B_{10}H_{14}$ of from 2.1 to 4.3; and a step of subjecting the mixture to a heat treatment.

As $LiBH_4$ as a raw material, usually commercially available products can be used. Further, the purity thereof is preferably 80% or more, and more preferably 90% or more. By using a compound having a purity within the above-described range, a desired crystal tends to be easily obtained. As $B_{10}H_{14}$ as another material, usually commercially available products can be used. The purity of $B_{10}H_{14}$ is preferably 95% or more, and more preferably 97% or more.

Regarding the mixing ratio between $LiBH_4$ and $B_{10}H_{14}$, the molar ratio of $LiBH_4/B_{10}H_{14}$ is from 2.1 to 4.3. As described above, by including a large amount of $LiBH_4$ as a raw material, ion conductivity can be improved. Meanwhile, by decreasing the amount of $LiBH_4$, water resistance can be improved. From the viewpoint of suppressing the reduction in ion conductivity in the case of being exposed to water while suppressing the reduction in ion conductivity, the molar ratio of $LiBH_4/B_{10}H_{14}$ is preferably from 2.3 to 4.1, and more preferably from 2.5 to 4.0.

Mixing of $LiBH_4$ and $B_{10}H_{14}$ is preferably performed under inert gas atmosphere. Examples of inert gas include helium, nitrogen and argon, and argon is more preferred. It is preferred that the concentrations of water and oxygen in the inert gas are controlled to be low, and it is more preferred that the concentrations of water and oxygen in the inert gas are less than 1 ppm.

The method for mixing is not particularly limited, and stirring and mixing in a solvent can be used. Mechanical mixing can also be used, and for example, a method using a mortar machine, a ball mill, a planetary ball mill, a bead mill, a planetary centrifugal mixer, a high speed stirring-type mixing apparatus, a tumbler mixer or the like can be used. Among them, a planetary ball mill is more preferred because of its excellent crushing power and mixing power. Mechanical mixing is preferably performed by a dry process, but it can also be performed in the presence of a solvent having reduction resistance. In the case of using a solvent (not limited to the above-described technique), an aprotic nonaqueous solvent is preferred, and specific examples thereof include an ether-based solvent such as tetrahydrofuran and diethyl ether, acetonitrile, N,N-dimethylformamide and N,N-dimethylacetamide.

The mixing time varies depending on the mixing method, but in the case of stirring and mixing in a solvent, the mixing time is, for example, 0.1 to 48 hours, and preferably 1 to 24 hours. Note that in the case of using a solvent capable of dissolving one of materials, for example, an ether-based solvent such as tetrahydrofuran and diethyl ether, acetonitrile, N,N-dimethylformamide, N,N-dimethylacetamide or the like which can dissolve $LiBH_4$, the mixing time can be reduced. Regarding the mixing time in the case of mechanical mixing, for example, in the case of using a planetary ball mill, the mixing time is 0.5 to 24 hours, and preferably 2 to 20 hours.

The purpose of the above-described mixing is to homogeneously disperse raw materials, and it is not required to cause a reaction. Accordingly, by subjecting the mixture obtained to X-ray diffraction measurement, peaks of $LiBH_4$ and $B_{10}H_{14}$ as raw materials can be confirmed.

When the mixture obtained by mixing as described above is subjected to a heat treatment, a reaction proceeds, and thus the ion conductor of the present invention can be obtained. Usually, the heating temperature is preferably 100 to 300° C., more preferably 150 to 250° C., and particularly preferably 170 to 230° C. When the temperature is lower than the above-described range, a desired crystal is not easily generated. Meanwhile, when the temperature is higher than the above-described range, there is concern for change in quality of the ion conductor.

The heating time slightly varies depending on the heating temperature, but usually, when the heating time is 3 to 40 hours, sufficient crystallization is obtained. The heating time is preferably 5 to 30 hours, and more preferably 10 to 20 hours. It is not preferred to perform heating at a high temperature for a long period of time because in this case, there is concern for change in quality of the ion conductor.

The heat treatment is preferably performed under inert gas atmosphere. Examples of inert gas include helium, nitrogen and argon, and argon is more preferred. It is preferred that the concentrations of water and oxygen in the inert gas are controlled to be low, and it is more preferred that the concentrations of water and oxygen in the inert gas are less than 1 ppm.

The reaction pressure is usually 0.1 Pa to 3 MPa as an absolute pressure. A slightly pressurized state when compared to ordinary pressure tends to suppress decomposition of the ion conductor due to hydrogen desorption, and the pressure is more preferably 101 kPa to 1 MPa, and particularly preferably 0.11 MPa to 0.5 MPa.

In the method for producing the ion conductor of the present invention, ion conductivity can be improved by further subjecting the mixture to a mechanical milling treatment prior to the step of the heat treatment. In this case, the time for performing the (first) mechanical milling treatment is preferably 0.5 to 7 hours, more preferably 1 to 6 hours, and particularly preferably 3 to 5 hours. Moreover, ion conductivity can be further improved by subjecting the ion conductor obtained as described above to the second mechanical milling treatment. In this case, the time for performing the (second) mechanical milling treatment is preferably 10 to 30 hours, more preferably 15 to 25 hours, and particularly preferably 18 to 22 hours. The technique for the first and second mechanical milling treatments is not particularly limited, and examples thereof include a vibrating mill and a planetary ball mill.

The ion conductor obtained by the above-described production method of the present invention has peaks at at least −15.6 ppm (±1 ppm), −17.6 ppm (+1 ppm), −29.4 ppm (±1.5 ppm), and −42.0 ppm (±2 ppm) in a $B^{11}$MAS NMR measurement, and when −15.6 ppm (±1 ppm) is regarded as Peak A and −42.0 ppm (±2 ppm) is regarded as Peak B, the intensity ratio of Peak B to Peak A (B/A) is preferably 0.1 to 2.0.

3. All-Solid-State Battery

The ion conductor of the present invention can be used as a solid electrolyte for all-solid-state batteries. Accordingly, according to one embodiment of the present invention, a solid electrolyte for all-solid-state batteries comprising the above-described ion conductor is provided. Further, according to another embodiment of the present invention, an all-solid-state battery, which is obtained by using the above-described solid electrolyte for all-solid-state batteries, is provided.

In this specification, the all-solid-state battery is an all-solid-state battery in which lithium ions perform electrical conduction, and particularly an all-solid-state lithium ion secondary battery. The all-solid-state battery has a structure in which a solid electrolyte layer is disposed between a positive electrode layer and a negative electrode layer. The ion conductor of the present invention may be contained as the solid electrolyte in at least one of the positive electrode layer, negative electrode layer and solid electrolyte layer. When used in an electrode layer, use in the positive electrode layer is more preferred compared to use in the negative electrode layer. This is because a side reaction is less likely to be caused in the positive electrode layer compared to the negative electrode layer. When the ion conductor of the present invention is contained in the positive electrode layer or negative electrode layer, the ion conductor is used in combination with a publicly-known positive electrode active material or negative electrode active material for lithium ion secondary batteries. As the positive electrode layer, a bulk type in which an active material and a solid electrolyte are mixed together is preferably used because the capacity per single cell is larger.

The all-solid-state battery is prepared by forming and laminating the above-described layers, and the forming method and laminating method for the respective layers are not particularly limited. Examples thereof include: a method in which a solid electrolyte and/or an electrode active material are dispersed in a solvent to provide a slurry-like mixture, which is applied by a doctor blade, spin coating or the like and subjected to rolling to form a film; a gas phase method in which film forming and lamination are performed by using a vacuum deposition method, ion plating method, sputtering method, laser ablation method or the like; and a pressing method in which powder is formed by hot pressing or cold pressing (not heating) and laminated. Since the ion conductor of the present invention is relatively soft, it is particularly preferred to prepare a battery by forming by pressing and lamination. Further, the positive electrode layer can also be formed by using a sol-gel method. Moreover, it is also possible to employ a method in which: an electrode layer containing an active material, a conduction assisting agent and a binder is formed in advance; into which a solution obtained by dissolving a solid electrolyte in a solvent or a slurry obtained by dispersing a solid electrolyte in a solvent is flowed; and after that, the solvent is removed, thereby putting the solid electrolyte in the electrode layer.

Regarding the atmosphere for preparing the all-solid-state battery, the preparation is preferably carried out in an inert gas in which the moisture content is controlled or in a dry room. Regarding the control of the moisture content, the dew point is −20° C. to −100° C., more preferably −30° C. to −80° C., and particularly preferably −40° C. to −75° C.

EXAMPLES

Hereinafter, the present invention will be more specifically described by way of examples, but the content of the present invention is not limited thereby.
<Preparation of Ion Conductor>

Example 1

In a glovebox under argon atmosphere, 100 mg of $LiBH_4$ (manufactured by Sigma-Aldrich, purity: ≥95%) and $B_{10}H_{14}$ (manufactured by Wako Pure Chemical Industries, Ltd., purity: ≥99.0%) was weighed so that the molar ratio of $LiBH_4$:$B_{10}H_{14}$ became 4:1 and then preliminary mixed using an agate mortar. Next, the preliminary-mixed raw materials were put into a 45 mL pot made of SUJ-2, and balls made of SUJ-2 (φ: 7 mm, number: 20) were also put into the pot, and the pot was completely sealed. The pot was attached to a planetary ball mill (P7 manufactured by Fritsch), and mechanical milling was performed at a rotation speed of 400 rpm for 5 hours to mix the raw materials. After that, a heat treatment was performed under a sealed argon atmosphere at 200° C. for 15 hours, thereby obtaining an ion conductor containing $L_{12}B_{12}H_{12}$ and $LiBH_4$.

Example 2

An ion conductor was produced in a manner similar to that in Example 1, except that the mixing molar ratio between $LiBH_4$ and $B_{10}H_{14}$ was changed to $LiBH_4$:$B_{10}H_{14}$=3:1.

Example 3

In a glovebox under argon atmosphere, 100 mg of the ion conductor obtained in Example 2 was weighed, it was put into a 45 mL pot made of SUJ-2, and balls made of SUJ-2 (p: 7 mm, number: 20) were also put into the pot, and the pot was completely sealed. The pot was attached to a planetary ball mill (P7 manufactured by Fritsch), and the second mechanical milling treatment was performed at a rotation speed of 400 rpm for 20 hours, thereby obtaining an ion conductor containing $Li_2B_{12}H_{12}$ and $LiBH_4$.

Comparative Example 1

$Li_2B_{12}H_{12} \cdot 4H_2O$ (manufactured by Katchem) was subjected to a heat treatment under vacuum atmosphere at 225° C. for 20 hours, thereby obtaining an ion conductor containing $Li_2B_{12}H_{12}$.

Comparative Examples 2-4

An ion conductor was produced in a manner similar to that in Example 1, except that the mixing molar ratio between $LiBH_4$ and $B_{10}H_{14}$ was changed as described below. The molar ratio of $LiBH_4$:$B_{10}H_{14}$ was 2:1 (Comparative Example 2), 1.5:1 (Comparative Example 3) or 1:1 (Comparative Example 4).

Comparative Examples 5-6

The second mechanical milling treatment was performed in a manner similar to that in Example 3, except that the ion conductor was changed to that obtained in Comparative Example 2 (Comparative Example 5) or that obtained in Comparative Example 4 (Comparative Example 6), thereby producing an ion conductor.

<X-Ray Diffraction Measurement>

Figure 1A:
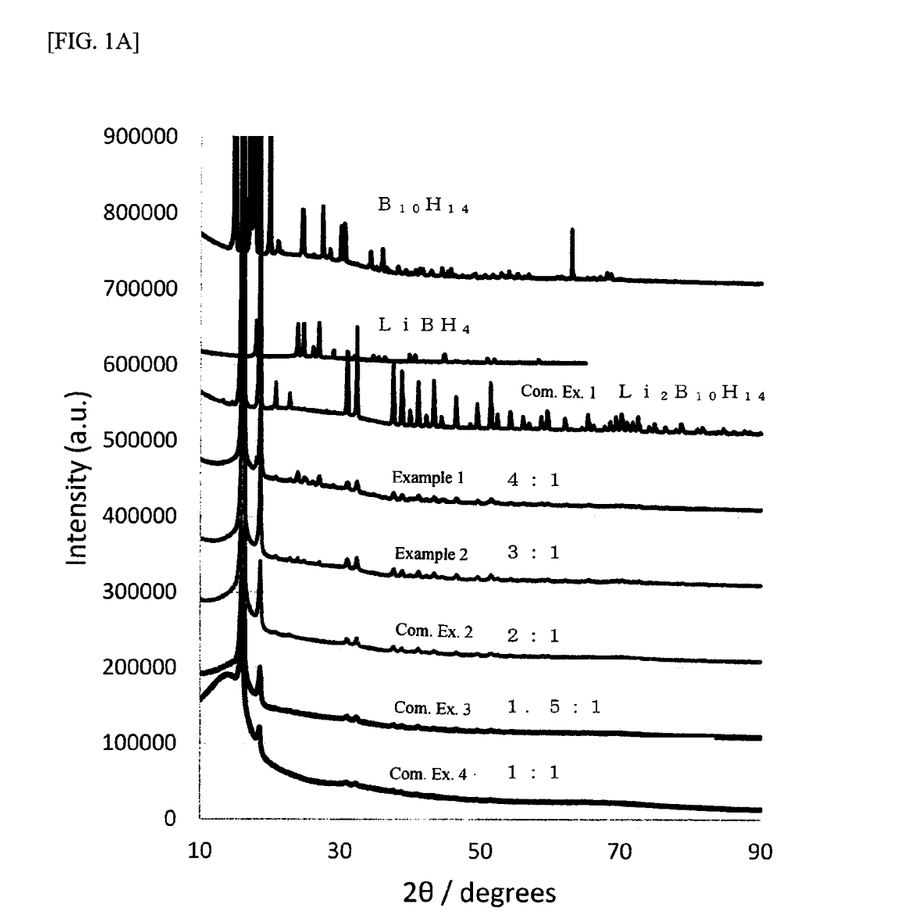
FIG. 1A shows X-ray diffraction peaks of powders of the ion conductors obtained in Examples 1-2 and Comparative Examples 1-4.
Figure 1B:
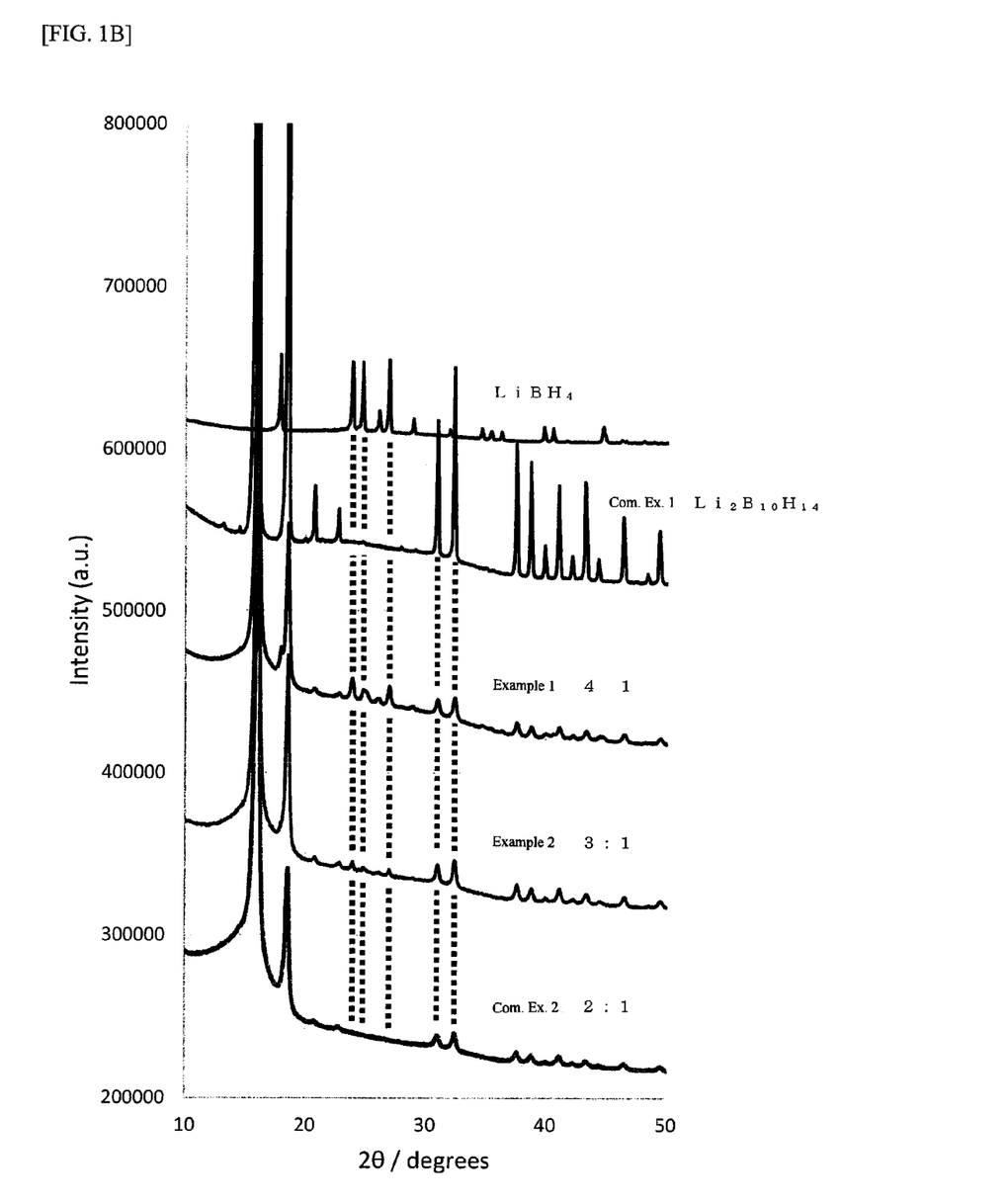
FIG. 1B is an enlarged view of diffraction peaks in a part of FIG. 1A (Examples 1-2 and Comparative Examples 1-2).
Figure 1C:
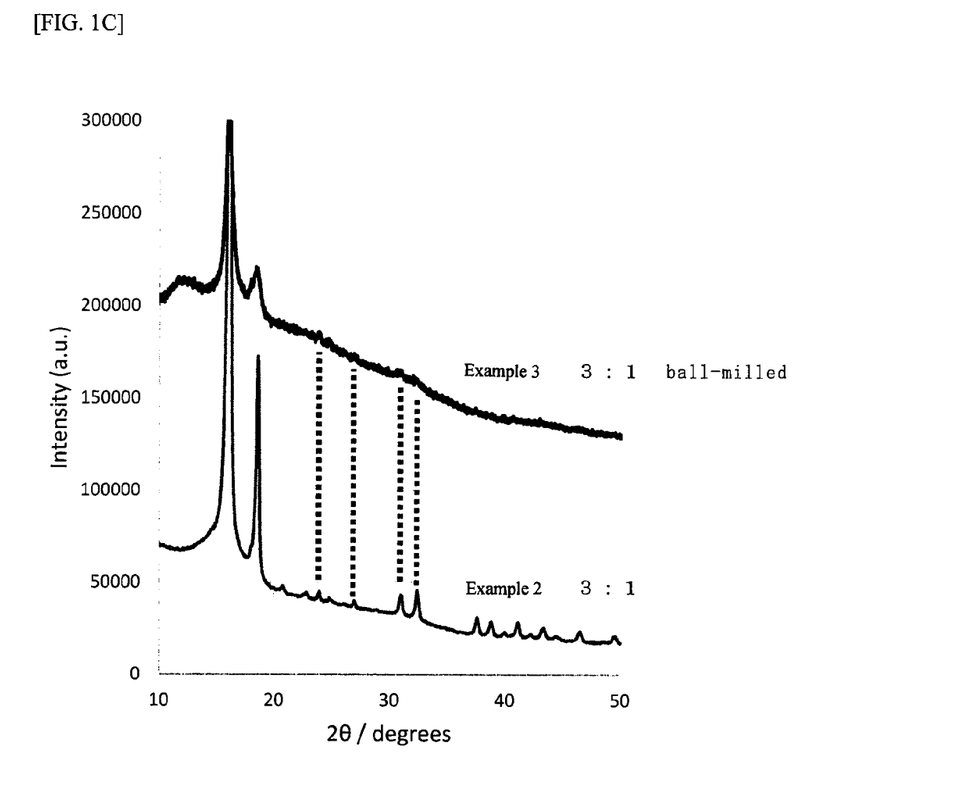
FIG. 1C shows X-ray diffraction peaks of powders of the ion conductors obtained in Examples 2-3.

Powders of the ion conductors obtained in Examples 1-3 and Comparative Examples 1-4 were subjected to the X-ray diffraction measurement under argon atmosphere at room temperature (X'pert Pro manufactured by PANalytical, CuKα: λ=1.5405 Å). The obtained X-ray diffraction peaks are shown in FIGS. 1A to 1C. For comparison, X-ray diffraction peaks of $LiBH_4$ and $B_{10}H_{14}$ as raw materials are also shown in FIG. 1A. In FIG. 1C, X-ray diffraction peaks of powders of the ion conductors obtained in Examples 2-3 are shown.

In Examples 1-2, X-ray diffraction peaks were observed at at least 2θ=16.1±0.5 deg, 18.6±0.5 deg, 24.0±0.5 deg, 24.9±0.8 deg, 27.0±0.8 deg, 31.0±0.8 deg and 32.5 0.8 deg. Regarding Example 3, the intensity of the X-ray diffraction peaks was small, but the above-described X-ray diffraction peaks can be slightly confirmed. It is considered that the peak intensity was small because the size of crystal grains was decreased by performing the mechanical milling treatment.

<$B^{11}$ MAS NMR Measurement>

Figure 2A:
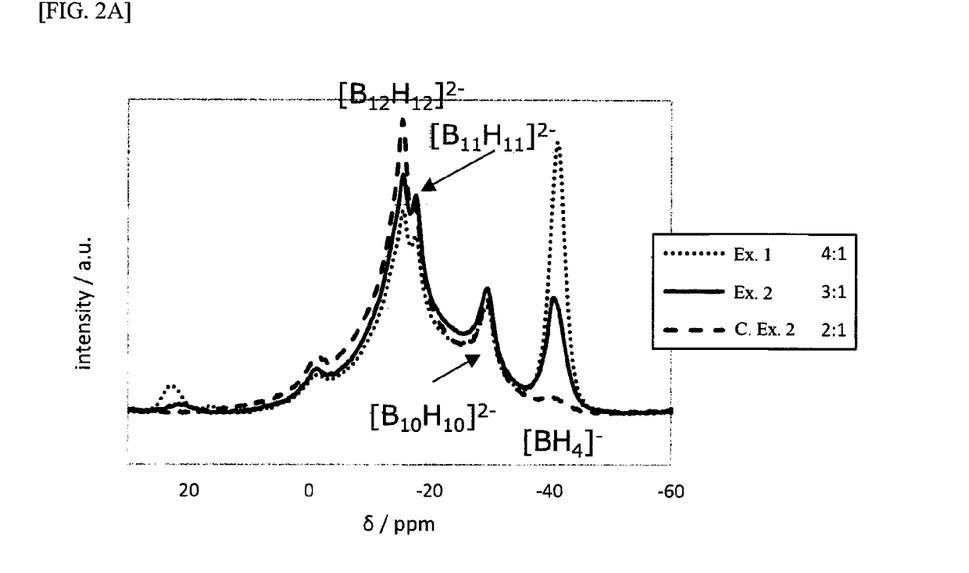
FIG. 2A shows $B^{11}$MAS NMR measurement results of powders of the ion conductors obtained in Examples 1-2 and Comparative Example 2.
Figure 2B:
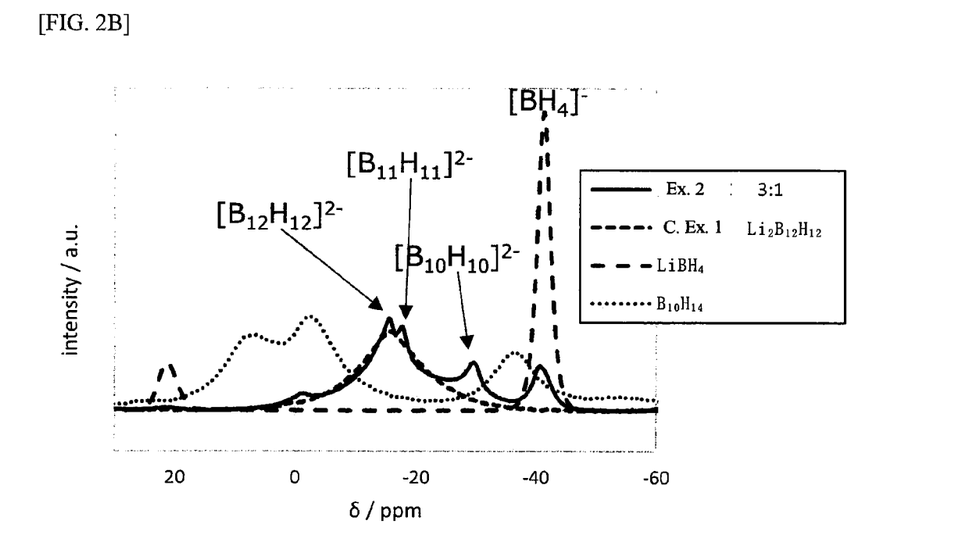
FIG. 2B shows $B^{11}$MAS NMR measurement results of powders of the ion conductors obtained in Example 2 and Comparative Example 1.

Powders of the ion conductors obtained in Examples 1-2 and Comparative Examples 1-2 were subjected to a $B^1$ MAS NMR measurement (ECA500 manufactured by JEOL Ltd.) using a sample tube not exposed to atmosphere (3.2 mm sealing sample tube manufactured by JEOL Ltd.). Regarding measurement conditions, MAS rotation was 10 kHz, a reference was $(C_2H_5)_2OBF_3$, and a waiting time was T1 obtained according to the Saturation recovery method×4 to 5 (sec). The results are shown in FIGS. 2A and 2B. In each of Examples 1-2 and Comparative Examples 1-2, in the observation, $[B_{12}H_{12}]^{2-}$ had a peak at −15.6 ppm (±1 ppm), $[BH_4]^{2-}$ had a peak at −17.6 ppm (±1 ppm), and $[B_{10}H_{10}]^{2-}$ had peaks at −1.7 ppm and −29.4 ppm (±1.5 ppm). In Examples 1-2, other than the above-described peaks, a peak at −42.0 ppm (±2 ppm) based on [BH$_4$]$^-$ was clearly observed. When −15.6 ppm (±1 ppm) was regarded as Peak A and −42.0 ppm (±2 ppm) was regarded as Peak B, the intensity ratio of Peak B to Peak A (B/A) was 1.17 in Example 1, 0.48 in Example 2, and 0.05 in Comparative Example 2.

<Ion Conductivity Measurement>

In a glovebox under argon atmosphere, each of the ion conductors obtained in Examples 1-3 and Comparative Examples 1-6 was subjected to uniaxial molding (240 MPa) to produce a disk having a thickness of about 1 mm and φ of 8 mm. The AC impedance was measured by the two-terminal method utilizing a lithium electrode, wherein the temperature was increased/decreased at 10° C. intervals in a temperature range of room temperature to 150° C. or 80° C. (HIOKI 3532-80, chemical impedance meter), and the ion conductivity was calculated. The measurement frequency range was 4 Hz to 1 MHz, and the amplitude was 100 mV.

Figure 3:
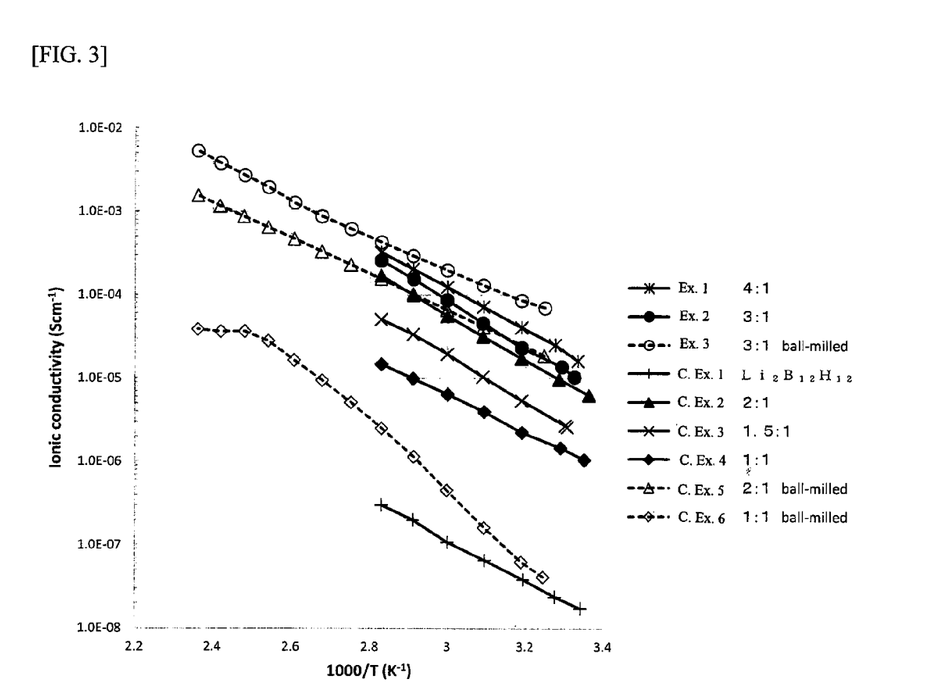
FIG. 3 shows results of the measurement of ion conductivities of the ion conductors obtained in Examples 1-3 and Comparative Examples 1-6.

The results of the measurement of the ion conductivity are shown in FIG. 3. Regarding Examples 1-3 and Comparative Examples 1-5, ion conductivities at the time of decreasing the temperature after increasing the temperature to 150° C. or 80° C. and the measurement were plotted. Regarding only Comparative Example 6, ion conductivities at the time of increasing the temperature in the second cycle of increasing/decreasing the temperature and the measurement were plotted. It was understood that as LiBH$_4$ increased, the ion conductivity was improved. Regarding the effect of the second mechanical milling treatment, when the molar ratio of LiBH$_4$:B$_{10}$H$_{14}$ was 1:1, the ion conductivity was reduced, and when the molar ratio was 2:1, the ion conductivity was almost equal, and when the molar ratio was 3:1, the ion conductivity was obviously increased, and thus the influence on the ion conductivity was not uniform. It is considered that satisfactory ion conductivity was shown in the case of 3:1 because a lattice defect was generated in a site of Li and hydrogen in a crystal by the second mechanical milling treatment.

<Exposure Test in Dry Room>

In a dry room at a dew point of −40° C. to −75° C., the ion conductor obtained in Example 3, Li$_2$B$_{12}$H$_{12}$ obtained in Comparative Example 1 and 3LiBH$_4$—LiI were exposed to the atmosphere for 6 hours. The change of the dew point in the dry room during this is described in Table 1. After the exposure to the atmosphere, the ion conductivity was measured. The results of comparison between ion conductivities of each sample before and after the exposure (25° C.) are shown in Table 2. The ion conductivity of 3LiBH$_4$—LiI was reduced to 1/20, whereas the ion conductivities of the ion conductor obtained in Example 3 and Li$_2$B$_{12}$H$_{12}$ obtained in Comparative Example 1 were not deteriorated, though these are all complex hydride-based solid electrolytes.

TABLE 1

Change of dew point during exposure test in dry room

| | Exposure time/hour | | | | | | |
|---|---|---|---|---|---|---|---|
| | 0 | 1 | 2 | 3 | 4 | 5 | 6 |
| Dew point of dry room/° C. | −46 | −60 | −72 | −50 | −71 | −69 | −48 |

TABLE 2

Influence on ion conductivity after exposure in dry room

| Solid electrolyte | Ion conductivity before exposure S/cm | Ion conductivity after exposure S/cm |
|---|---|---|
| Sample of Example 3 | $1.1 \times 10^{-4}$ | $1.8 \times 10^{-4}$ |
| Sample of Comparative Example 1 | $1.2 \times 10^{-8}$ | $1.6 \times 10^{-8}$ |
| 3LiBH$_4$—LiI | $2.0 \times 10^{-5}$ | $1.0 \times 10^{-6}$ |

The invention claimed is:

1. A method for producing an ion conductor comprising Li$_2$B$_{12}$H$_{12}$ and LiBH$_4$, which comprises:

obtaining a mixture by mixing LiBH$_4$ and B$_{10}$H$_{14}$ at a molar ratio LiBH$_4$/B$_{10}$H$_{14}$ of from 2.1 to 4.3; and subjecting the mixture to a heat treatment.

2. The method for producing an ion conductor according to claim 1, wherein the temperature of the heat treatment is 100 to 300° C.

3. The method for producing an ion conductor according to claim 1, which comprises subjecting the mixture to a mechanical milling treatment prior to the heat treatment.

4. The method for producing an ion conductor according to claim 3, wherein the time for carrying out the mechanical milling treatment is 0.5 to 7 hours.

5. The method for producing an ion conductor according to claim 3, which comprises subjecting the mixture to a second mechanical milling treatment after the heat treatment.

6. The method for producing an ion conductor according to claim 5, wherein the time for carrying out the second mechanical milling treatment is 10 to 30 hours.

7. The method for producing an ion conductor according to claim 1, wherein the ion conductor obtained has peaks at at least −15.6 ppm (±1 ppm), −17.6 ppm (±1 ppm), −1.7 ppm and −29.4 ppm (±1.5 ppm), and −42.0 ppm (±2 ppm) in a B$^{11}$MAS NMR measurement, and wherein when −15.6 ppm (±1 ppm) is regarded as Peak A and −42.0 ppm (±2 ppm) is regarded as Peak B, the intensity ratio of Peak B to Peak A (B/A) is 0.1 to 2.0.

8. A method for producing an all-solid-state battery, which comprises carrying out molding using the ion conductor obtained by the method according to claim 1 under an atmosphere at a dew point of −30° C. to −80° C.

9. An ion conductor comprising L$_{12}$B$_{12}$H$_{12}$ and LiBH$_4$, which has peaks at at least −15.6 ppm (±1 ppm), −17.6 ppm (±1 ppm), −1.7 ppm and −29.4 ppm (±1.5 ppm), and −42.0 ppm (±2 ppm) in a B$^{11}$MAS NMR measurement, wherein when −15.6 ppm (±1 ppm) is regarded as Peak A and −42.0 ppm (±2 ppm) is regarded as Peak B, the intensity ratio of Peak B to Peak A (B/A) is 0.1 to 2.0.

10. The ion conductor according to claim 9, which has X-ray diffraction peaks at at least 2θ=16.1±0.5 deg, 18.6±0.5 deg, 24.0±0.5 deg, 24.9±0.8 deg, 27.0±0.8 deg, 31.0±0.8 deg and 32.5±0.8 deg.

11. A solid electrolyte for all-solid-state batteries, which comprises the ion conductor according to claim 9.

* * * * *